(12) United States Patent
Ihs

(10) Patent No.: US 10,148,180 B2
(45) Date of Patent: Dec. 4, 2018

(54) DC-DC CONVERTER HAVING DIGITAL CONTROL AND REFERENCE PWM GENERATORS

(71) Applicant: Endura Technologies LLC

(72) Inventor: Hassan Ihs, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 15/667,522

(22) Filed: Aug. 2, 2017

(65) Prior Publication Data

US 2018/0019674 A1  Jan. 18, 2018

Related U.S. Application Data

(63) Continuation of application No. 14/732,505, filed on Jun. 5, 2015, now Pat. No. 9,735,677.

(51) Int. Cl.
*H02M 3/158* (2006.01)
*H02M 3/157* (2006.01)
*H02M 3/156* (2006.01)
*H02M 1/32* (2007.01)
*H02M 1/00* (2006.01)

(52) U.S. Cl.
CPC ........... *H02M 3/158* (2013.01); *H02M 3/157* (2013.01); *H02M 1/32* (2013.01); *H02M 2001/0019* (2013.01); *H02M 2003/1566* (2013.01)

(58) Field of Classification Search
CPC ...... H02M 3/156; H02M 3/157; H02M 3/158; H02M 2003/156; H02M 2003/1566; H02M 2003/158
See application file for complete search history.

(56) References Cited

U.S. PATENT DOCUMENTS

| | | | |
|---|---|---|---|
| 6,373,724 B2 | 4/2002 | Nagai et al. | |
| 6,509,721 B1 | 1/2003 | Liebler | |
| 7,221,129 B2 | 5/2007 | Matsuo et al. | |
| 7,884,590 B2 | 2/2011 | Liu | |
| 7,923,977 B2 | 4/2011 | Huang | |
| 8,125,206 B2 | 2/2012 | Akiyama et al. | |
| 8,698,475 B2 * | 4/2014 | Dong | H02M 3/156 323/282 |
| 2007/0253230 A1 | 11/2007 | Lipcsei | |
| 2010/0026256 A1 * | 2/2010 | Liu | H02M 3/158 323/282 |

(Continued)

FOREIGN PATENT DOCUMENTS

JP      2014-217164 A    11/2014

OTHER PUBLICATIONS

International Search Report on related PCT Application No. PCT/US2016/036105 from International Searching Authority (KIPO) dated Sep. 28, 2016.

(Continued)

*Primary Examiner* — Matthew Nguyen
(74) *Attorney, Agent, or Firm* — Klein, O'Neill & Singh, LLP

(57) ABSTRACT

A DC-DC converter operating in pulse frequency modulation (PFM) and pulse width modulation (PWM) modes includes a plurality of PWM signal generators. The PWM signal generators generate PWM signals with different duty cycles. PWM signals with larger duty cycles may be selected for use in undervoltage situations.

6 Claims, 7 Drawing Sheets

(56) References Cited

U.S. PATENT DOCUMENTS

| | | |
|---|---|---|
| 2011/0297581 A1 | 12/2011 | Anqel |
| 2012/0194159 A1 | 8/2012 | Harriman et al. |
| 2012/0223685 A1 | 9/2012 | Tsai et al. |
| 2013/0043855 A1 | 2/2013 | Wu |
| 2013/0307508 A1 | 11/2013 | Hallak |
| 2014/0035552 A1 | 2/2014 | Dai et al. |
| 2014/0209503 A1 | 7/2014 | Anqel |
| 2015/0222171 A1* | 8/2015 | Nguyen .................. H02M 1/08 323/282 |
| 2015/0256074 A1* | 9/2015 | Biondi .................... H02M 1/38 323/271 |

OTHER PUBLICATIONS

Written Opinion on related PCT Application No. PCT/US2016/036105 from International Searching Authority (KIPO) dated Sep. 28, 2016.

U.S. Appl. No. 14/732,505, filed Jun. 5, 2015, Hassan Ihs, US 2016-0359411 A1, Office Action dated Nov. 7, 2016, Notice of Allowance dated Apr. 12, 2017.

Extended European Search Report on related European Application No. 16804674.6 from the European Patent Office (EPO) dated Apr. 3, 2018.

Robert W. Erickson et al., "Steady-State Equivalent Circuit Modeling, Losses, and Efficiency", Fundamentals of Power Electronics, second edition, Jan. 1, 2001, Kluwer Academic Publishers, Norwell, Massachusetts, pp. 39-57.

Robert Boylestad et al., "Integrator, Electronic Devices and Circuit Theory: Pearson New International Edition", Jan. 1, 2014, pp. 643-645.

* cited by examiner

US 10,148,180 B2

DC-DC CONVERTER HAVING DIGITAL CONTROL AND REFERENCE PWM GENERATORS

CROSS-REFERENCE TO RELATED APPLICATION

The present application is a continuation of U.S. patent application Ser. No. 14/732,505, filed Jun. 5, 2015, the disclosures of which are incorporated by reference herein.

BACKGROUND OF THE INVENTION

The present invention relates generally to power regulation, and more particularly to power regulation by DC-DC switching converters.

DC-DC switching converters generally provide for regulated power to operational circuitry, for example integrated circuits in semiconductor devices. These integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

In many cases power requirements of the operational circuitry may vary greatly, and vary greatly within short time frames. Properly controlling converter operation in the face of sudden changes in desired output power may be difficult to accomplish.

BRIEF SUMMARY OF THE INVENTION

Aspects of the invention relate to control of a DC-DC converter. One embodiment provides a digitally controlled DC-DC converter, comprising: a high side switch and a low side switch coupled in series, with a first end of an output inductor coupled to a node between the high side switch and the low side switch and a second end of the output inductor providing a regulated output for a load, with an output capacitor coupled to the second end of the output inductor; a first pulse width modulation (PWM) signal generator configured to generate a first PWM signal having a first duty cycle; a second PWM signal generator configured to generate a second PWM signal having a second duty cycle, the second duty cycle greater than the first duty cycle; and logic circuitry to select either the first PWM signal or the second PWM signal for use in controlling the high side switch and the low side switch.

Another embodiment provides a method of controlling a switching DC-DC converter, comprising: generating a first pulse width modulation (PWM) signal having a first duty cycle; generating a second PWM signal having a second duty cycle, the second duty cycle having a different duration than the first duty cycle; controlling operation of at least some switches of the switching DC-DC converter based on the first PWM signal if an output voltage of the DC-DC converter is below a first predefined voltage level; and controlling operation of the at least some switches of the switching DC-DC converter based on the second PWM signal if the output voltage of the DC-DC converter is above the first predefined voltage level.

Another embodiment provides a digitally controlled DC-DC converter, comprising: a high side switch and a low side switch coupled in series, with a first end of an output inductor coupled to a node between the high side switch and the low side switch and a second end of the output inductor providing a regulated output for a load, with an output capacitor coupled to the second end of the output inductor; a plurality of pulse width modulation (PWM) signal generators each configured to generate a PWM signal having a duty cycle of a different duration; and circuitry to select a one of the PWM signals for use in controlling the high side switch and the low side switch based on a measure of the regulated output.

These and other aspects of the invention are more fully comprehended upon review of this disclosure.

DETAILED DESCRIPTION

Figure 1:
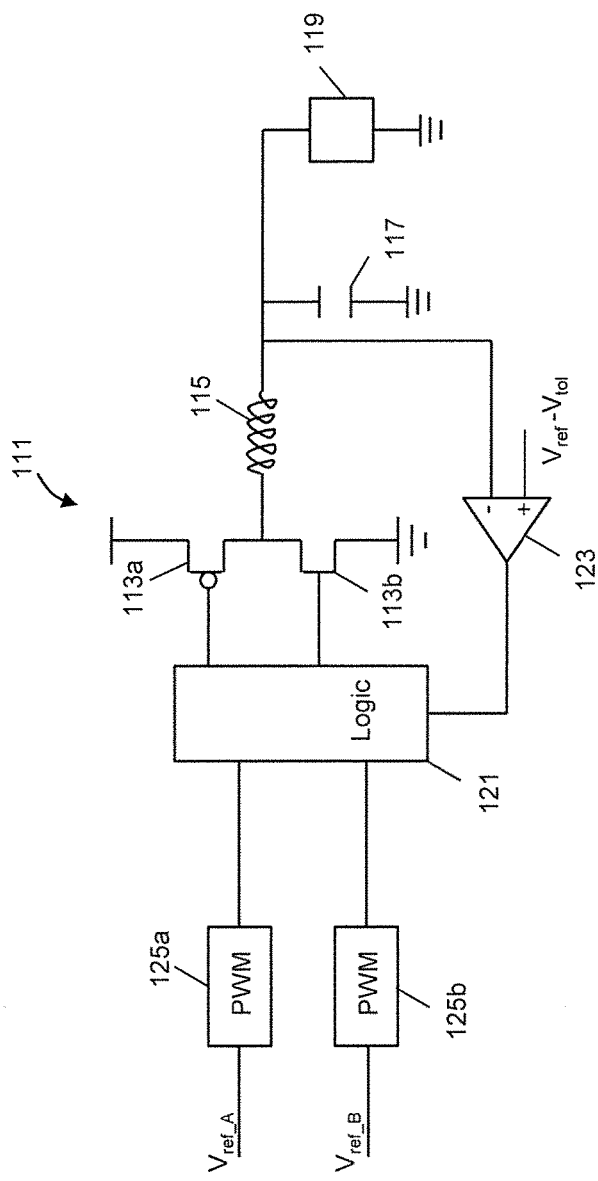
FIG. 1 is a semi-schematic, semi-block circuit diagram of a regulated DC-DC converter in accordance with aspects of the invention.

FIG. 1 is a semi-schematic, semi-block circuit diagram of a regulated DC-DC converter in accordance with aspects of the invention. The DC-DC converter of FIG. 1 operates switches 111 so as to regulate voltage applied to a load 119. In doing so, the converter operates the switches either in accordance with pulse width modulation (PWM) signals generated by either a first PWM generator 125a or a second PWM generator 125b. Selection of which PWM signals to use is based on whether an output voltage of the converter is below a predetermined magnitude, for example as indicated by a comparator 123. In various embodiments the first PWM generator generates signals having a duty cycle less than that of signals generated by the second PWM generator, with signals from the second PWM generator being used if an output voltage of the DC-DC converter is lower than a predefined voltage.

In most embodiments the PWM generators generate the PWM signals based a supply voltage to the DC-DC converter and one or more reference voltages. In some embodiments the second PWM generator is effectively provided a higher reference voltage for use than the first PWM generator for generating the signals, with the higher reference voltage effectively increasing the duty cycle. In some embodiments the first and second PWM generators determine duty cycles of their respective output signals based on first and second reference voltage signals provided to them, respectively, and the supply voltage provided to the DC-DC converter. In some embodiments the second reference voltage signal provided to the second PWM generator is greater than the first reference voltage signal provided to the first PWM generator. In some embodiments the second reference voltage signal is greater than the first reference voltage signal by a voltage reference adjustment. In some embodiments a magnitude of the voltage reference adjustment is on the order of ten percent of the first reference voltage signal. In some embodiments the first reference voltage signal is a desired output voltage of the DC-DC converter. In some embodiments the first reference voltage signal is a desired output voltage of the DC-DC converter plus a bias voltage. In some embodiments the bias voltage is on the order of ten percent of the desired output voltage of the DC-DC converter.

Accordingly, referring to FIG. 1, the converter includes a high side switch 113a and a low side switch 113b providing the switches 111, an output inductor 115, an output capacitor 117, a logic block 121 for controlling the high side switch 113a and the low side switch 113b, the comparator 123, a first PWM generator 125a, and a second PWM generator 125b.

A first terminal, e.g., a source terminal, of the high side switch 113a is connected to a high voltage source providing an input voltage. A second terminal, e.g., a drain terminal, of the high side switch 113a is connected to a first terminal, e.g., a drain terminal, of the low side switch 113b. A second terminal, e.g., a source terminal, of the low side switch 113b is connected to a low voltage source, e.g., a ground. Accordingly, the high side switch 113a and the low side switch 113b are connected in series between the high voltage source and the low voltage source. The high side and low side switches 113a and 113b may be formed, for example, with metal-oxide-semiconductor field-effect transistor (MOSFET) transistors, with a p-channel MOS transistor forming the high side switch 113a and an n-channel MOS transistor forming the low side switch 113b. In operation either the high side switch is active, the low side switch is active, or neither switch is active.

A first terminal of the output inductor 115 is connected to a node between the high side switch 113a and the low side switch 113b. A second terminal, an output terminal, of the output inductor 115 is connected to a first terminal of the output capacitor 117 having a second terminal connected to ground. The output capacitor 117 generally supplies an output voltage to a terminal of the load 119, which is shown as having another terminal connected to ground.

The comparator 123 receives as inputs the output of the output inductor/output capacitor and a reference voltage. The reference voltage has a magnitude equal to the desired output voltage of the DC-DC converter, minus a tolerance amount. In general, it is preferred that the DC-DC converter provide an output voltage equal to the reference voltage, but not lower than the reference voltage minus the tolerance amount. The comparator is configured to produce a signal indicating whether the output voltage of the DC-DC converter is greater than or less than the reference voltage minus the tolerance amount. In some embodiments, the comparator 123 may output a high signal when the output voltage is lower than the reference voltage minus the tolerance amount, and output a low signal otherwise.

The first and second PWM generators 125a and 125b are generally utilized to generate PWM signals to be used to operate the high side and low side switches. The first and second PWM generators generally produce a series of pulses based on a frequency and a duty cycle of the PWM generators, for example based on reference voltages and output voltage of the DC-DC converter. Accordingly, FIG. 1 shows the first PWM generator receiving a reference voltage $V_{ref\_A}$ and the second PWM generator receiving a reference voltage $V_{ref\_B}$. In some embodiments $V_{ref\_A}$ is the desired output voltage of the DC-DC converter plus a bias offset, which may be for example about ten percent of the desired output voltage of the DC-DC converter. In some embodiments $V_{ref\_B}$ is $V_{ref\_A}$ plus an adjustment amount, which, similar to the bias offset, also may be for example about ten percent of the desired output voltage. In addition, although not illustrated in FIG. 1, in most embodiments the first and second PWM generators also receive a signal indicative of the voltage supplied to the DC-DC converter.

Figure 6:
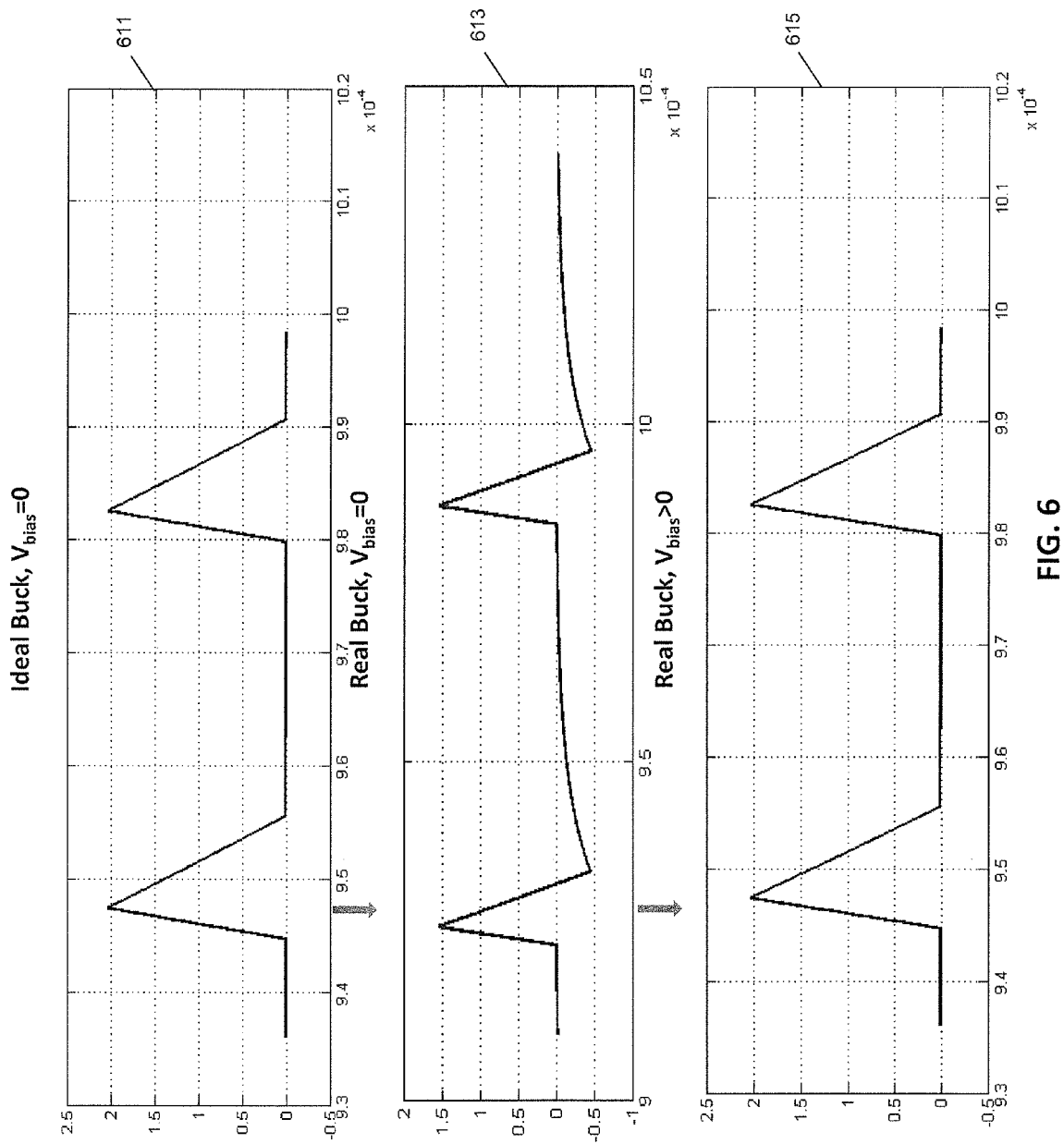
FIG. 6 provides a series of charts illustrating effects of use of a bias voltage for modifying operation of a converter in accordance with aspects of the invention.

An example of usefulness of adjusting the reference voltage to include the bias offset may be comprehended considering the charts of FIG. 6. The charts of FIG. 6 illustrate inductor current with respect to time. A first chart 611 shows pulse frequency modulated inductor current for an ideal buck converter. For the ideal buck converter the inductor current remains positive throughout operation, with the inductor current returning to zero between pulses. A second chart 613, however, shows that for a real buck converter, having resistive losses associated with the inductor, inductor current reverses and goes negative about the end of each pulse. The negative inductor current may be reduced or avoided through compensating the reference voltage by the bias offset, as shown in a third chart 615.

The logic block 121 may receive the signal produced by the comparator 123, and the pulses produced by the first and second PWM generators to control state of the high side and low side switches 113a and 113b. The logic block 121 generally controls the state of the high and low side switches 113a and 113b by way of forming control signals for controlling those switches. In various embodiments the logic block effectively passes signals from the first PWM generator to the high side and low side switches if the DC-DC converter output voltage is greater than the reference voltage minus the tolerance amount, and effectively passes signals from the second PWM generator to the high side and low side switches if the DC-DC converter output voltage is less than the reference voltage minus the tolerance amount. As the signals from the second PWM generator have an increased duty cycle time as compared to the signals from the first PWM generator, the high side switch is active for greater amounts of time, allowing for provision of increased power by the DC-DC converter.

Figure 2:
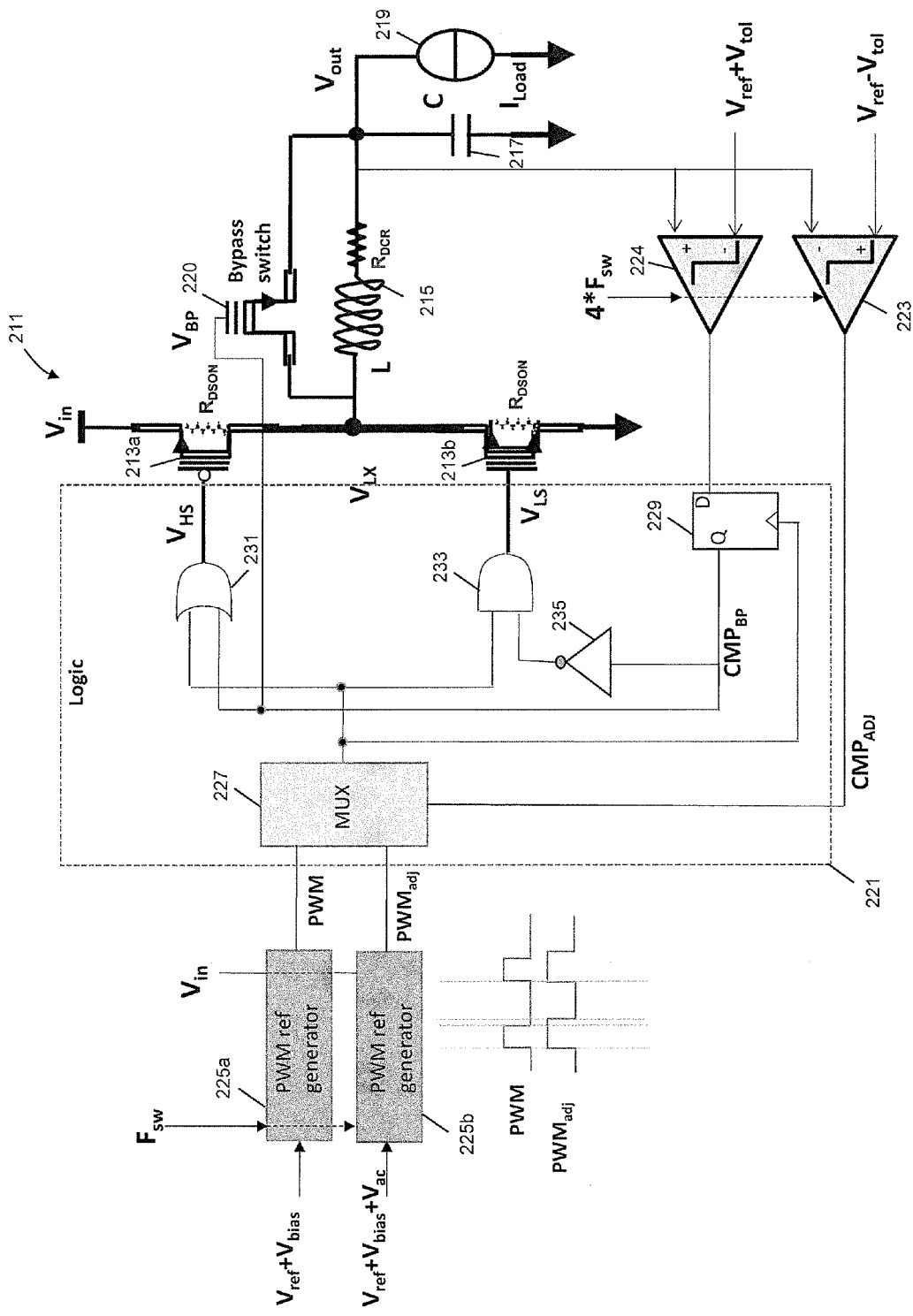
FIG. 2 is a semi-schematic, semi-block diagram of a further regulated DC-DC converter including circuitry of a logic block in accordance with aspects of the invention.

FIG. 2 is a semi-schematic, semi-block diagram of a further regulated DC-DC converter including circuitry of a logic block in accordance with aspects of the invention. The DC-DC converter of FIG. 2 is similar to the DC-DC converter of FIG. 1.

As illustrated in FIG. 2, the converter 211 includes a high side switch 213a, a low side switch 213b, a bypass switch 220, an output inductor 215, an output capacitor 217, a power load 219, a logic circuitry 221 for controlling the high side, low side, and bypass switches, a first comparator 223, a second comparator 224, a first pulse-width modulation (PWM) generator 225a, and a second PWM generator 225b.

The high side switch 213a and the low side switch 213b are coupled in series between a first voltage source and a second voltage source. The first voltage source is at a higher voltage than the second voltage source, with the high side switch coupling the first voltage source to the low side switch, and the low side switch coupling the second voltage source to the high side switch. For illustrative purposes, the high side and low side switches also show a resistance ($R_{DSON}$) provided by the switches.

The output inductor 215 has one end coupled to a node between the high side switch 213a and the low side switch 213b, and also to a first end of the bypass switch 220. Another end of the output inductor is coupled to the output capacitor 217, a second end of the bypass switch 220, and the power load 219, with a load current $I_{Load}$ passing through the power load. A node coupling the other end of the output inductor, the output capacitor, and the load generally may be considered the output of the DC-DC converter. For illustrative purposes, the other end of the output inductor 215 also shows a resistance ($R_{DCR}$) provided by the output inductor and associated circuit paths, e.g., a parasitic effect.

The first comparator 223 and the second comparator 224 generally have a first input coupled to the output node, their second inputs coupled to reference voltages, and the comparators configured to determine which input is greater. With respect to the first comparator 223, the reference voltage, for example, may be a desired output voltage of the DC-DC converter minus a tolerance voltage. The first comparator therefore determines whether the output voltage of the DC-DC converter is less than or greater than a desired output voltage minus a tolerance voltage. With respect to the second comparator 224, the reference voltage may be the desired output voltage of the DC-DC converter plus a tolerance voltage. The second comparator therefore determines whether the output voltage of the DC-DC converter is greater than or less than the desired output voltage plus the tolerance voltage.

The first PWM generator 225a and the second PWM generator 225b generally generate signals to control operation of the high side and low side switches, based on reference input signals and a signal (not shown in FIG. 2) indicative of voltage supplied to the DC-DC converter. In various embodiments the PWM generators generate the signals with a duty cycle dependent on the reference input signals and the signal indicative of voltage supplied to the DC-DC converter. In some embodiments, the reference input signal of the first PWM generator 225a may be a sum of the desired output voltage of the DC-DC converter and a bias voltage. In some embodiments, the reference input voltage signal of the second PWM generator 225b may be a sum of the desired output voltage of the DC-DC converter, the bias voltage, and a voltage offset. In some embodiments, the voltage offset is 10% of the reference voltage. As illustrated in FIG. 2, in some embodiments, the signals generated by the second PWM generator 225b (which may be referred to as $PWM_{adj}$) have a duty cycle greater than that of the signals generated by the first PWM generator 225a (which may be referred to as PWM). Accordingly, as the signals indicate relative duration for which the high side switch is active, the high side switch is active for a longer period of time when the $PWM_{adj}$ signals are used compared to than when the PWM signals are used.

The logic circuitry 221 may receive the output signals from the first and second comparators, and the signals generated by the first and second PWM generators to control states of the high side, low side, and bypass switches. In some embodiments, the logic circuitry 221 may be implement circuitry of the logic block 121 of FIG. 1. The logic circuitry 221 generally controls the states of the high side, low side, and bypass switches by way of producing control signals for controlling those switches. Referring to FIG. 2, the logic circuitry 221 includes a multiplexer 227 which receives the PWM and PWMadj signals, and selects one of them for use based on an output $CMP_{ADJ}$ of the first comparator 223.

As shown in FIG. 2, a latch 229 stores the signal produced by the second comparator 224. The latch stores the signal when an output of the multiplexer, indicating an end of the duty cycle of the converter switches, transitions to a high state. An output of the latch is provided to a gate of the bypass switch, an OR gate 231 and, after passing through an inverter 235, to an AND gate 233. The OR gate also receives the output of the multiplexer, and provides an output to a gate of the high side switch. The high side switch, active when it's gate input is low, is therefore active when both the output of the multiplexer and the output of the latch are low. The AND gate also receives the output of the multiplexer, and provides an output to a gate of the low side switch. The low side switch, active when its gate input is high, is therefore active when the inverted latch output is high and the output of the multiplexer is high.

Figure 7:
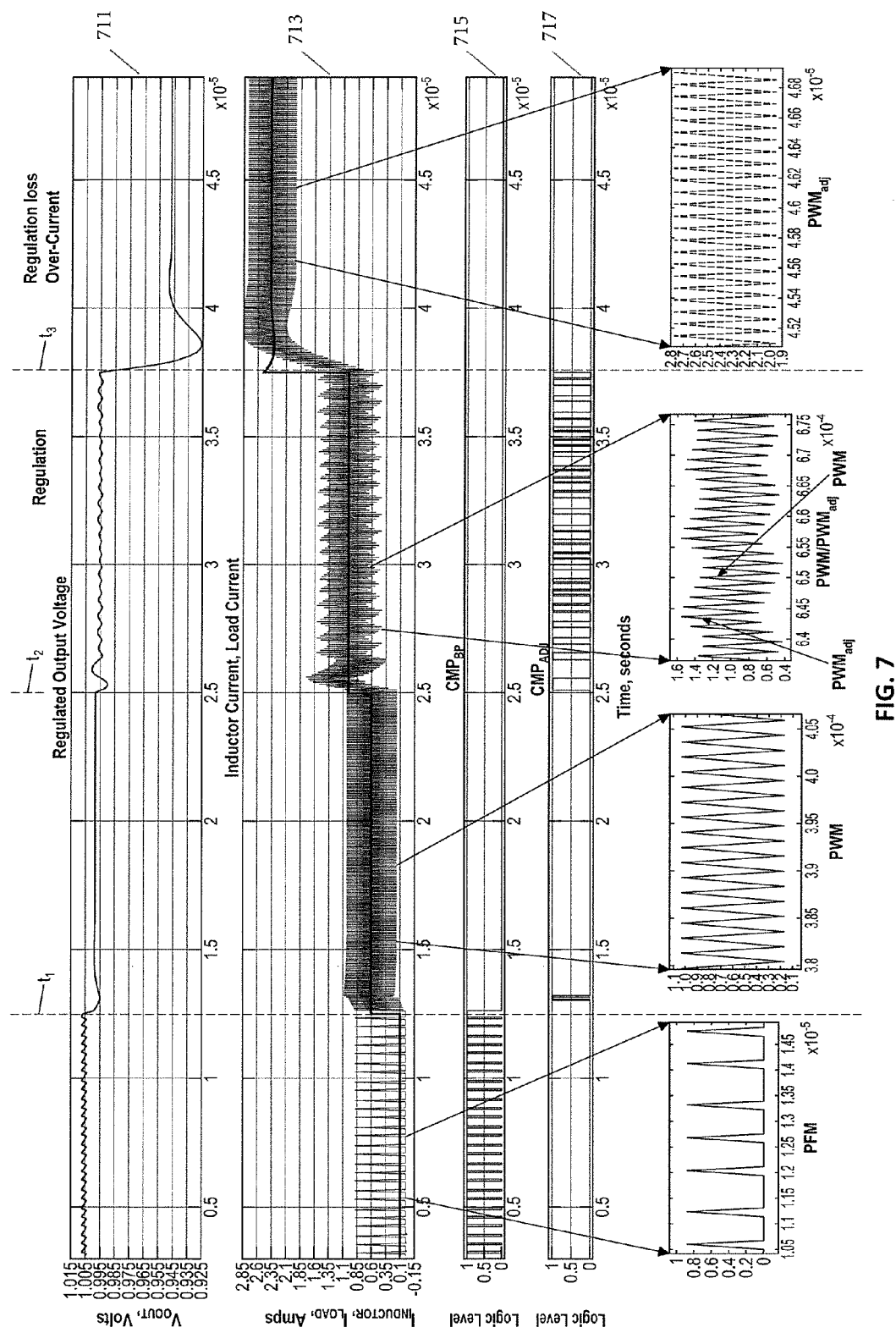
FIG. 7 provides charts illustrating operation of a DC-DC converter in accordance with aspects of the invention under various load conditions.

FIG. 7 provides a series of charts indicating status of a DC-DC converter, for example the DC-DC converter of FIG. 2, in operation. Each of the charts has a common time frame along their x-axis. A first chart 711 shows regulated converter output voltage and a second chart 713 shows both inductor current and load current. A third chart 715 shows status of the $CMP_{BP}$ signal, indicating an overvoltage situation in which the bypass switch is active, and a fourth chart 715 shows status of the $CMP_{ADJ}$ signal, indicating an undervoltage situation in which the $PWM_{adj}$ signals, instead of the PWM signals, are used to control the converter switches.

During a first time period, until a time t1, the load is drawing little current, and the output voltage periodically overshoots desired output voltage. Consequently, the $CMP_{BP}$ signal periodically goes high, with the converter bypass switch becoming active and interrupting operation of the high side and low side switches. In such a situation, the converter is effectively operating in a pulse frequency modulation mode, as shown in a first exploded view of the inductor current.

At time t1 the load begins to draw a slightly greater amount of current, the output voltage drops slightly, and the $CMP_{BP}$ signal generally no longer goes high. In general the output voltage does not drop sufficiently to cause the $CMP_{ADJ}$ signal to go high, so the converter operates the high side and low side switches using signals from the PWM generator.

At time t2 the load begins to draw a greater amount of current. Fluctuations in the output voltage cause the $CMP_{ADJ}$ signal to alternate between high and low states, resulting in alternating operation of the high side and low side switches with signals from the PWM generator and signals from the $PWM_{adj}$ generator.

At time t3 the load begins to draw an even greater amount of current, sufficiently large that the converter does not maintain the output voltage in regulation limits. In such a circumstance, the $CMP_{ADJ}$ signal goes and stays high, and the high side and low side switches operate solely in accordance with signals from the $PWM_{adj}$ generator.

Figure 3:
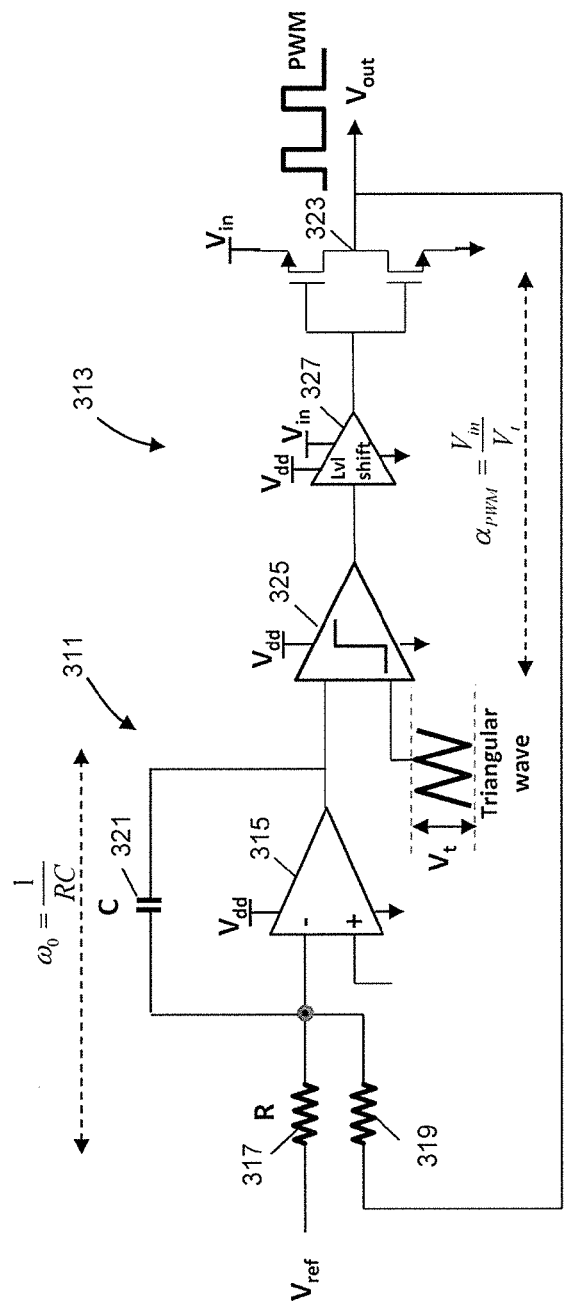
FIG. 3 is a semi-schematic, semi-block diagram of a PWM generator in accordance with aspects of the invention.

FIG. 3 is a semi-schematic, semi-block diagram of a PWM generator in accordance with aspects of the invention. The PWM generator generally provides a first order unconditionally stable loop. The loop provides an output PWM duty cycle which tracks variations in input supply voltage such that application of the PWM duty cycle will yield a desired output voltage. In some embodiments the PWM generator of FIG. 3 is used as the PWM generators of the embodiments of FIGS. 1 and 2, as well as FIG. 5 (later discussed herein).

The PWM generator of FIG. 3 includes an integrator portion 311 and a gain portion 313. The integrator portion integrates an error between a reference voltage and an output signal of the PWM generator. In the embodiment of FIG. 3 the integrator portion comprises an operational amplifier circuit having a capacitor 321 coupled between an output of an operational amplifier 315 and its inverting input. Also coupled to the inverting input are a reference voltage, by way of a first resistor 317 having a resistance R, and an output of the PWM generator, by way of a second resistor 319, also having a resistance R. The reference voltage may be as discussed with respect to the other figures, for example the reference voltage may be a desired output voltage of the DC-DC converter plus a voltage tolerance, or the desired output voltage plus a voltage adjustment.

Output of the integrator is provided to the gain portion. The gain portion includes a comparator 325, which also receives a triangular wave input having height of $V_t$. As the integrator and the comparator operate using a supply voltage $V_{dd}$, while tracking of PWM duty cycle with respect to variations in DC-DC converter supply voltage $V_{in}$ is desired, output of the comparator is level shifted with respect to $V_{in}$ by a level shifter 327, and the level shifted output is provided to an inverter 323. The inverter provides a PWM output signal, which as mentioned above, is also fed back to the operational amplifier, as scaled by the resistor 319.

Figure 4:
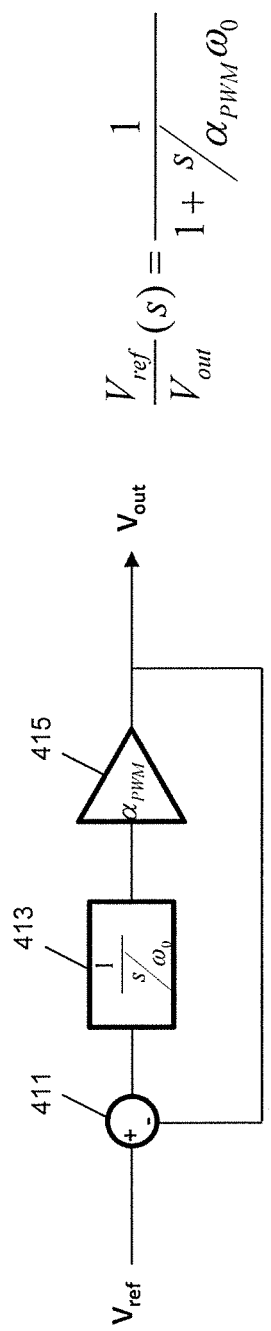
FIG. 4 is a block diagram of the PWM generator of FIG. 3.

A block diagram and associated transfer function for the PWM generator of FIG. 3 are provided in FIG. 4. The reference voltage and feedback from output of the PWM generator are provided to a subtractor, which subtracts the feedback from the reference voltage. The result is provided to an integrator 413, with output of the integrator amplified by a gain block 415, which provides the output of the PW generator.

Figure 5:
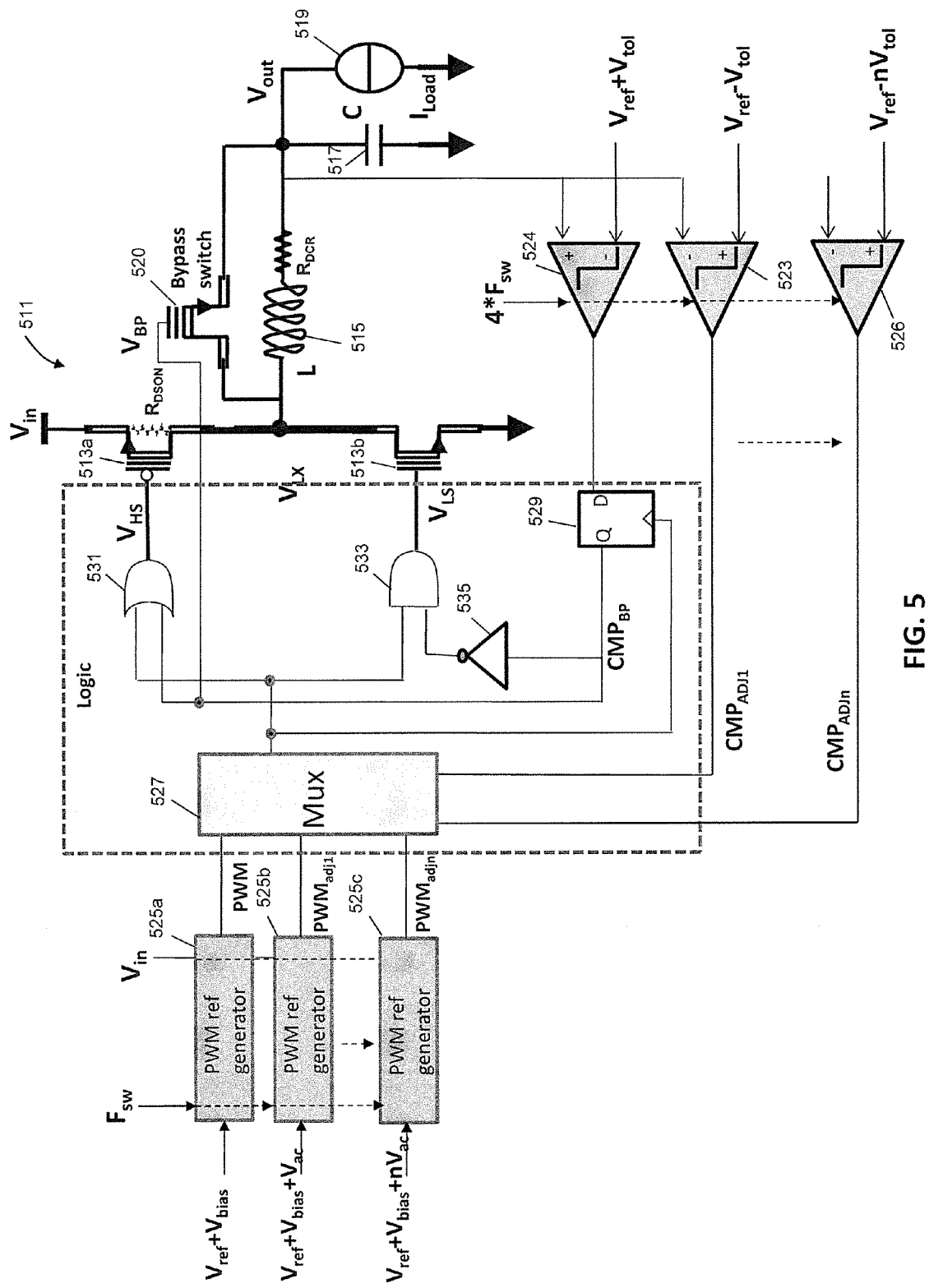
FIG. 5 is a semi-schematic, semi-block diagram of a further regulated DC-DC converter in accordance with aspects of the invention.

FIG. 5 is a semi-schematic, semi-block diagram of a further regulated DC-DC converter in accordance with aspects of the invention. As illustrated in FIG. 5, the converter 511 includes a high side switch 513a, a low side switch 513b, a bypass switch 520, an output inductor 515, an output capacitor 517, a power load 519, a controller circuitry 521 for controlling the high side, low side, and bypass switches, a voltage overshoot detector 524, a plurality of voltage undershoot detectors, a pulse-width modulation (PWM) generator 525a, and a plurality of scaled PWM generators. In general, the embodiment of FIG. 5 is largely the same as the embodiment of FIG. 2. The embodiment of FIG. 5, however, includes a PWM generator and a plurality of scaled PWM generators. Outputs of the secondary PWM generators are selected for use in controlling the regulator switches depending on where an output voltage of the converter falls in a plurality of voltage ranges.

As with the DC-DC converter of FIG. 2, the high side switch 513a and the low side switch 513b are coupled in series between a first voltage source and a second voltage source. The first voltage source is at a higher voltage than the second voltage source, with the high side switch coupling the first voltage source to the low side switch, and the low side switch coupling the second voltage source to the high side switch. For illustrative purposes, the high side switch also shows a resistance ($R_{DSON}$) provided by the switch.

The output inductor 515 has one end coupled to a node between the high side switch 513a and the low side switch 513b, and also to a first end of the bypass switch 520. Another end of the output inductor is coupled to the output capacitor 517, a second end of the bypass switch 520, and the power load 519, with a load current $I_{Load}$ passing through the power load. A node coupling the other end of the output inductor, the output capacitor, and the power load generally may be considered the output of the DC-DC converter. For illustrative purposes, the other end of the output inductor 515 also shows a resistance ($R_{DCR}$) provided by the output inductor and associated circuit paths, e.g., a parasitic effect.

The voltage overshoot detector 524 and each of the plurality of the voltage undershoot detectors (e.g., a first voltage undershoot detector 523 and a second voltage undershoot detector 526) generally have a first input coupled to the output node, their second inputs coupled to reference voltages, and the detectors are configured to determine which input is greater. The plurality of the voltage undershoot detectors, for example, may allow the DC-DC converter to determine whether a reference voltage, at various magnitudes, is greater than or less than the voltage at the output node. With respect to the voltage overshoot detector 524, the reference voltage, for example, may be a sum of a desired output voltage of the DC-DC converter and a tolerance voltage. The voltage overshoot detector, therefore, determines whether the output voltage of the DC-DC converter is less than or greater than a desired output voltage plus a tolerance voltage. With respect to each of the plurality of the voltage undershoot detectors, the reference voltage may be the desired output voltage of the DC-DC converter minus a product of the tolerance voltage and a predetermined value. The predetermined value generally ranges from 1 to n, where n represents the number of voltage undershoot detectors in the DC-DC converter. As shown in the embodiment of FIG. 5, the converter 511 has two voltage undershoot detectors, the first voltage undershoot detector 523 and the second voltage undershoot detector 526. Accordingly, in such embodiment, n would equal to two with the predetermined value ranging from 1 to 2.

The PWM generator 525a and each of the plurality of the scaled PWM generators generally generate signals to control operation of the high side and low side switches, based on reference input signals and a signal (not shown in FIG. 5) indicative of output voltage of the DC-DC converter. In various embodiments, the PWM generators generate the signals with a duty cycle dependent on the reference input signals and the signal indicative of voltage supplied to the DC-DC converter. In some embodiments, the reference input signal of the PWM generator 525a may be a sum of the desired output voltage of the DC-DC converter and a bias voltage. In some embodiments, the reference input voltage signal of each of the plurality of the scaled PWM generators (e.g., a first scaled PWM generator 525b and a second scaled PWM generator 525c) may be a sum of the desired output voltage of the DC-DC converter, the bias voltage, and a product of a voltage offset and the predetermined value (as previously discussed with respect to the voltage undershoot detectors). In many embodiments, the number of scaled PWM generators is equivalent to the number of voltage undershoot detectors in the DC-DC converter, with a one-to-one correspondence between the plurality of the scaled PWM generators and the plurality of the voltage undershoot detectors based on the predetermined value. Accordingly, in many embodiments, the predetermined value is also equivalent to the number of scaled PWM generators in the DC-DC converter. In some embodiments, the voltage offset is equal to or approximately ten percent of the reference voltage. As illustrated in FIG. 5, in some embodiments, the signals generated by each of the plurality of the scaled PWM generators (which may be referred to as PWMadj1 . . . PWMadjn) have a duty cycle greater than that of the signals generated by the PWM generator 525a (which may be referred to as PWM). Accordingly, as the signals indicate relative duration for which the high side switch is active, the high side switch is active for a longer period of time when the PWMadj1 . . . PWMadjn signals are used compared to than when the PWM signals are used. In some embodiments, the signals generated by one scaled PWM generator have a duty cycle greater than that of the signals generated by another scaled PWM generator, depending on the predetermined value associated with each scaled PWM generator. For example, in the embodiment of FIG. 5, the signals generated by the second scaled PWM generator 525c would have a duty cycle greater than that of the signals generated by the first scaled PWM generator 525b.

The controller circuitry 521, in some embodiments, is similar to or the same as the logic circuitry 221 of FIG. 2. The controller circuitry 521 may receive the output signals from the voltage overshoot detector 524 and the plurality of the voltage undershoot detectors, and the signals generated by the PWM generator 525a and the plurality of the scaled PWM generators to control states of the high side, low side, and bypass switches. The controller circuitry 521 generally controls the states of the high side, low side, and bypass switches by way of producing control signals for controlling those switches. Referring to FIG. 5, the controller circuitry 521 includes a selector 527 which receives the PWM and PWMadj1 . . . PWMadjn signals, and selects one of them for use based on outputs $CMP_{ADJ1}$ . . . $CMP_{ADJn}$ of the plurality of the voltage undershoot detectors.

As shown in FIG. 5, the latch 529 stores the signal produced by the voltage overshoot detector 524. The latch stores the signal when an output of the selector, indicating an end of the duty cycle of the converter switches, transitions to a high state. An output of the latch is provided to a gate of the bypass switch, an OR gate 531 and, after passing through an inverter 535, to an AND gate 533. The OR gate also receives the output of the selector, and provides an output to a gate of the high side switch. The high side switch, active when its gate input is low, is therefore active when both the output of the selector and the output of the latch are low. The AND gate also receives the output of the selector, and provides an output to a gate of the low side switch. The low side switch, active when its gate input is high, is therefore active when the inverted latch output is high and the output of the selector is high.

Although the invention has been discussed with respect to various embodiments, it should be recognized that the invention comprises the novel and non-obvious claims supported by this disclosure.

What is claimed is:

1. A method of controlling a switching DC-DC converter, comprising:
   generating a first pulse width modulation (PWM) signal having a first duty cycle;
   generating a second PWM signal having a second duty cycle, the second duty cycle having a different duration than the first duty cycle;
   determining that an output voltage of the DC-DC converter is below a first predefined voltage level;
   in response to determining that the output voltage of the DC-DC converter is below the first predefined voltage level, controlling operation of at least some switches of the switching DC-DC converter based on the first PWM signal;
   determining that the output voltage of the DC-DC converter is above the first predefined voltage level;
   in response to determining that the output voltage of the DC-DC converter is above the first predefined voltage level, controlling operation of the at least some switches of the switching DC-DC converter based on the second PWM signal.

2. The method of claim 1, wherein the at least some switches of the switching DC-DC converter are a high side switch and a low side switch, with a node between the high side switch and the low side switch providing a node for coupling to an output inductor of the switching DC-DC converter.

3. The method of claim 2, further comprising coupling ends of the output inductor of the switching DC-DC converter if the output voltage of the DC-DC converter is above a second predefined voltage level.

4. The method of claim 3, further comprising opening the high side switch and the low side switch if the output voltage of the DC-DC converter is above the second predefined voltage level.

5. The method of claim 4, wherein the first predefined voltage level is a desired DC-DC converter output voltage minus a first voltage tolerance.

6. The method of claim 4, wherein the second predefined voltage level a desired DC-DC converter output voltage plus a second voltage tolerance.

* * * * *